US009013526B2

United States Patent
Yamauchi

(10) Patent No.: US 9,013,526 B2
(45) Date of Patent: Apr. 21, 2015

(54) DISPLAY ELEMENT, IMAGE DISPLAY SYSTEM, AND METHOD OF CONTROLLING DISPLAY ELEMENT

(75) Inventor: Taisuke Yamauchi, Matsumoto (JP)

(73) Assignee: Seiko Epson Corporation (JP)

( * ) Notice: Subject to any disclaimer, the term of this patent is extended or adjusted under 35 U.S.C. 154(b) by 228 days.

(21) Appl. No.: 13/369,866

(22) Filed: Feb. 9, 2012

(65) Prior Publication Data

US 2012/0212523 A1 Aug. 23, 2012

(30) Foreign Application Priority Data

Feb. 21, 2011 (JP) ................................. 2011-034284

(51) Int. Cl.
| | | |
|---|---|---|
| G09G 5/02 | (2006.01) | |
| G02F 1/1347 | (2006.01) | |
| G03B 21/60 | (2014.01) | |
| G09G 3/00 | (2006.01) | |
| H04N 9/31 | (2006.01) | |
| G03H 1/02 | (2006.01) | |
| G02F 1/1334 | (2006.01) | |
| G02F 1/15 | (2006.01) | |

(Continued)

(52) U.S. Cl.
CPC .......... *G02F 1/13476* (2013.01); *G02F 1/1334* (2013.01); *G02F 1/15* (2013.01); *G03B 21/60* (2013.01); *G09G 3/003* (2013.01); *G09G 3/3473* (2013.01); *G09G 3/38* (2013.01); *H04N 9/3197* (2013.01); *G03H 1/0256* (2013.01); *G03H 2250/42* (2013.01); *G03H 2260/12* (2013.01); *G03H 2260/33* (2013.01)

(58) Field of Classification Search
CPC ..................................................... G02F 1/1334
USPC ........ 349/5, 15, 62; 345/690, 173; 353/94, 79
See application file for complete search history.

(56) References Cited

U.S. PATENT DOCUMENTS

| | | | |
|---|---|---|---|
| 5,416,617 A | 5/1995 | Loiseaux et al. | |
| 6,046,547 A * | 4/2000 | Nishio et al. ............... | 315/169.3 |

(Continued)

FOREIGN PATENT DOCUMENTS

| | | |
|---|---|---|
| JP | 06-082748 | 3/1994 |
| JP | 06-504635 A | 5/1994 |

(Continued)

OTHER PUBLICATIONS

"Development of a switchable mirror film, which enable one to switch between transparent state and mirror state", National Institute of Advanced Industrial Science and Technology, Nov. 21, 2007.*

(Continued)

*Primary Examiner* — Kathy Wang-Hurst
*Assistant Examiner* — Peijie Shen
(74) *Attorney, Agent, or Firm* — Harness, Dickey & Pierce, P.L.C.

(57) ABSTRACT

A display element includes a transmission/diffusion switching layer switched between a diffusion state of diffusing visible light and a transmission state of transmitting visible light by electrical switching, and a transmission/reflection switching layer switched between a reflection state of reflecting visible light and a transmission state of transmitting visible light by electrical switching, and the transmission/diffusion switching layer and the transmission/reflection switching layer overlap each other.

9 Claims, 7 Drawing Sheets

(51) Int. Cl.
*G09G 3/34* (2006.01)
*G09G 3/38* (2006.01)

(56) References Cited

U.S. PATENT DOCUMENTS

| | | |
|---|---|---|
| 6,421,147 B2 | 7/2002 | Takada |
| 6,597,477 B2 | 7/2003 | Takada et al. |
| 6,600,527 B1 | 7/2003 | Basturk et al. |
| 6,885,483 B2 | 4/2005 | Takada |
| 2003/0202228 A1 | 10/2003 | Takada et al. |
| 2004/0263928 A1 | 12/2004 | Takada et al. |
| 2007/0085977 A1* | 4/2007 | Fricke et al. ............ 353/79 |
| 2007/0085978 A1* | 4/2007 | Yamauchi ............... 353/94 |
| 2009/0167966 A1* | 7/2009 | Nam et al. .............. 349/5 |
| 2009/0225244 A1* | 9/2009 | Wang et al. ............. 349/15 |
| 2011/0063490 A1 | 3/2011 | Ogita |
| 2012/0162268 A1* | 6/2012 | Fleck et al. ............. 345/690 |

FOREIGN PATENT DOCUMENTS

| | | |
|---|---|---|
| JP | 2000-075139 | 3/2000 |
| JP | 2001-527228 A | 12/2001 |
| JP | 2004-347784 A | 12/2004 |
| JP | 2005-274630 A | 10/2005 |
| JP | 2006-322971 A | 11/2006 |
| JP | 2010-197486 | 9/2010 |
| JP | 2011-059589 A | 3/2011 |

OTHER PUBLICATIONS

Kazuki Tajima, et al. "Development of a Switchable Mirror Film That Is Electrically Changed between Reflective and Transparent States", National Institute of Advanced Industrial Science and Technology (AIST), (with English translation) Nov. 21, 2007 (4 pages).

* cited by examiner

DISPLAY ELEMENT, IMAGE DISPLAY SYSTEM, AND METHOD OF CONTROLLING DISPLAY ELEMENT

BACKGROUND

1. Technical Field

The present invention relates to a display element, an image display system, and a method of controlling the display element.

2. Related Art

In the past, there has been known a technology of displaying a picture on a screen using a projector or the like. In recent years, there has been proposed a technology of diffusing or scattering a picture light in a transparent screen to thereby display the picture therein. By using the technology, figures and objects in the real space where the screen is disposed are observed through the screen to thereby make it possible to assimilate the picture with the real space.

For example, by projecting the information, which is related to the articles displayed in the window, on the window glass, it is possible to efficiently display the information without hindering observation of the articles on display. In the windows of a bank or the like, by displaying the visitor's information on the receptionist side, or displaying the receptionist's information on the visitor side, it becomes possible to proceed with the office counter work smoothly. In videoconferences, unmanned receptions, and so on, by projecting a picture only with a clipped figure, it is possible to provide reality as if the figure were present.

As described above, by using a transparent screen, it is possible to provide a picture representation without making the observer appreciate presence of the display as a device, and thus, it becomes possible to perform efficient information provision and picture rendering with a sense of presence. As the transparent screen, those disclosed in JP-A-2000-75139 (Document 1) and JP-A-6-82748 (Document 2) can be cited. In Document 1, there is proposed a method of manufacturing a hologram screen for recording a pattern due to the interference between a reference light as a non-diffused light and an object light diffused by a light diffusing body. Document 2 proposes a screen capable of switching between transmission and diffusion using a liquid crystal layer.

An Internet website "light control mirror" by Advanced Industrial Science and Technology (AIST), Internet URL: http://www.aist.go.jp/aist_j/press_release/pr2007/pr20071121/pr20071121.html, (Document 3) discloses a light control mirror film made of an electrochromic material varied between a mirror state and a transparent state by controlling the applied voltage.

Incidentally, the screens using the technologies of Documents 1 and 2 are transparent in a nonuse state, and therefore make it possible to provide video equipment decreasing the presence of the screen itself in the nonuse state as much as possible and being in harmony with the surrounding environment. However, the scattering characteristics of the screens include mainly forward scattering and only little backward scattering. In other words, in the case of using the screens as a screen for a projection type projector, it is possible to project a sufficiently visible picture as a rear projection screen. However, in the case of using the screens as a front projection screen, scattering is insufficient, and therefore, the projector fails to project the sufficiently visible picture on the screen.

Therefore, there has been demanded a screen for the front projection type projector capable of decreasing the presence of the screen in the nonuse state, and providing sufficient scattering characteristics in the use state. Further, in order to realize such a screen, there have been requested a display element for controlling diffusion and transmission of light, and a method of controlling the display element.

SUMMARY

An advantage of some aspects of the invention is to solve at least a part of the problem described above, and can be implemented as the following forms or application examples.

Application Example 1

This application example of the invention is directed to a display element including a transmission/diffusion switching layer switched between a diffusion state of diffusing visible light and a transmission state of transmitting visible light by electrical switching, and a transmission/reflection switching layer switched between a reflection state of reflecting visible light and a transmission state of transmitting visible light by electrical switching, wherein the transmission/diffusion switching layer and the transmission/reflection switching layer overlap each other.

According to the display element of this application example of the invention, the transmission/diffusion switching layer and the transmission/reflection switching layer are provided so as to be overlapped each other each of which can be switched in the state by electrical switching. When it is required to diffuse the light, the transmission/diffusion switching layer is set to the diffusion state, and the transmission/reflection switching layer is set to the reflection state. Thus, the visible light entering the display element is diffused in the transmission/diffusion switching layer. Further, the visible light transmitted through the transmission/diffusion switching layer is reflected by the transmission/reflection switching layer, and is then diffused in the transmission/diffusion switching layer. Therefore, the visible light can surely be diffused.

When it is required to transmit the visible light, the transmission/diffusion switching layer is set to the transmission state, and the transmission/reflection switching layer is set to the transmission state. Thus, the visible light entering the display element is transmitted through the transmission/diffusion switching layer and the transmission/reflection switching layer. Therefore, it is possible for the display element to surely transmit the visible light. Therefore, the display element is capable of switching between the transmission state and the diffusion state by electrical switching with preferable quality.

Application Example 2

This application example of the invention is directed to the display element of the above application example of the invention, wherein the transmission/diffusion switching layer includes a pair of electrodes, and a polymer-dispersed liquid crystal layer disposed between the pair of electrodes, and the transmission/reflection switching layer includes a light control mirror layer having an electrochromic material.

According to the display element of this application example of the invention, the transmission/diffusion switching layer includes the pair of transparent electrodes, and the polymer-dispersed liquid crystal layer disposed between the pair of transparent electrodes. Therefore, the transmission/diffusion switching layer can surely be switched between the transmission state and the diffusion state by switching the voltage applied to the pair of transparent electrodes. Further, the transmission/reflection switching layer includes the light control mirror layer having an electrochromic material. Therefore, the transmission/reflection switching layer can surely be switched between the reflection state and the transmission state by switching the voltage applied to the electrochromic material.

Application Example 3

This application example of the invention is directed to the display element of the above application example of the invention, wherein the light control mirror layer and the polymer-dispersed liquid crystal layer are stacked via a protective layer.

According to the display element of this application example of the invention, the light control mirror layer and the polymer-dispersed liquid crystal layer are stacked one another via the protective layer. Generally, the polymer-dispersed liquid crystal layer is stacked on the transmission/reflection switching layer in the condition of being sandwiched by the pair of substrates. In this application example of the invention, the transmission/reflection switching layer and the polymer-dispersed liquid crystal layer are stacked via the protective layer instead of the substrate. According to this configuration, the distance between the transmission/reflection switching layer and the polymer-dispersed liquid crystal layer can be shortened. Therefore, when setting the display element to the diffusion state, it becomes possible to reduce the picture blur due to crossing between the light entering the display element and then forward scattered by a liquid crystal diffusion section of the polymer-dispersed liquid crystal layer prior to reaching the place where the light is reflected by the transmission/reflection switching layer, and the light forward scattered by the liquid crystal diffusion section of the polymer-dispersed liquid crystal layer after reflected by the mirror section of the light control area.

Application Example 4

This application example of the invention is directed to the display element of the above application example of the invention, wherein the transmission/reflection switching layer includes a pair of electrodes, the light control mirror layer forms one of the pair of electrodes included in the transmission/reflection switching layer, the light control mirror layer is located on a side of the transmission/reflection switching layer, the side being nearer to the polymer-dispersed liquid crystal layer, and the light control mirror layer also forms one of the pair of electrodes included in the transmission/diffusion switching layer.

According to the display element of this application example of the invention, the light control mirror layer is located between the polymer-dispersed liquid crystal layer and the transmission/reflection switching layer. Further, the light control mirror layer functions as both of the electrode for applying a voltage to the polymer-dispersed liquid crystal layer and the electrode for applying a voltage to the transmission/reflection switching layer. Therefore, the distance between the polymer-dispersed liquid crystal layer and the transmission/reflection switching layer can further be shortened compared to the case of disposing the electrodes corresponding to the respective layers between the polymer-dispersed liquid crystal layer and the transmission/reflection switching layer. In addition thereto, it is possible to reduce the number of interfacial surfaces between the place where the light is diffused by the transmission/diffusion switching layer and the place where the light is reflected by the transmission/reflection switching layer. Therefore, the Fresnel reflection can be reduced, and it becomes possible for the observer to visually recognize the picture with more sharply-defined resolution.

Application Example 5

This application example of the invention is directed to the display element of the above application example of the invention, wherein the light control mirror layer is grounded.

According to the display element of this application example of the invention, the light control mirror layer is grounded. Therefore, if it is required to keep the transparent/mirror state of the transmission/reflection switching layer in a constant state when driving the polymer-dispersed liquid crystal layer, by applying a positive/negative voltage to the electrode different from the light control mirror layer in the polymer-dispersed liquid crystal layer, the transparent/mirror state of the light control mirror layer can be kept constant. As a result, the drive control of the display element can be made easy.

Application Example 6

This application example of the invention is directed to the display element of the above application example of the invention, wherein the polymer-dispersed liquid crystal layer is in a reverse mode in which the transmission state can be obtained with no voltage applied.

According to the display element of this application example of the invention, the polymer-dispersed liquid crystal layer is of the "reverse mode" in which the transparent state is set when no voltage is applied thereto. The transmission/reflection switching layer is bistable, and when setting the display element to the transmission state, the transmission/reflection switching layer is set to the transparent state in advance. The polymer-dispersed liquid crystal layer is kept in the transparent state in the state in which no voltage is applied thereto. Thus, in the case of setting the display element to the transmission state, the transparent state can be maintained in the state in which the power consumption is reduced. As a result, a resource-saving display element can be obtained.

Application Example 7

This application example of the invention is directed to the display element of the above application example of the invention, wherein the polymer-dispersed liquid crystal layer is a hologram structure including polymer sections having a birefringent property and liquid crystal sections disposed alternately in a stacked manner, and is capable of electrically switching between transmission and diffusion of visible light passing through the hologram structure.

According to the display element of this application example of the invention, the polymer-dispersed liquid crystal layer is a hologram structure including the polymer sections having a birefringent property and the liquid crystal sections disposed alternately in a stacked manner. Further, the hologram pattern emitted by the polymer-dispersed liquid crystal layer can be switched electrically. Thus, the angle at which the incident light passes through the polymer-dispersed liquid crystal layer can be made different between before the incident light reaches the transmission/reflection switching layer and after the incident light is reflected by the transmission/reflection switching layer, and therefore, it becomes possible to make the action of diffusion/transmission between before reaching the transmission/reflection switching layer and after reflected by the transmission/reflection switching layer. In other words, it becomes possible to make hologram record in the liquid crystal layer so that the diffusion is performed with respect only to the angle of the light reflected by the transmission/reflection switching layer. Thus, the incident light is prevented from being diffused prior to reaching the transmission/reflection switching layer. Therefore, it becomes possible to emit only the light reflected by the transmission/reflection switching layer and then forward scattered by the liquid crystal diffusion section. As a result, it becomes possible to further reduce the picture blur when the diffused light forms the picture, and thus it becomes possible to visually recognize the picture with extremely clear resolution.

Application Example 8

This application example of the invention is directed to a method of controlling the display element of the above application example, the method including controlling the display element such that, when the display element is set to the diffusion state, the transmission/diffusion switching layer is set to the diffusion state, and the transmission/reflection switching layer is set to the reflection state.

According to the method of controlling the display element of this application example of the invention, when setting the display element to the diffusion state, the transmission/diffusion switching layer is in the diffusion state, and the transmission/reflection switching layer is in the reflection state. Therefore, the visible light entering the display element is diffused in the transmission/diffusion switching layer. Further, the visible light transmitted through the transmission/diffusion switching layer is reflected by the transmission/reflection switching layer, and is then diffused in the transmission/diffusion switching layer. Therefore, the visible light can surely be diffused.

Application Example 9

This application example of the invention is directed to a method of controlling the display element of the above application example, the method including controlling the display element such that, when the display element is set to the transmission state, the transmission/diffusion switching layer is set to the transmission state, and the transmission/reflection switching layer is set to the transmission state.

According to the method of controlling the display element of this application example of the invention, when setting the display element to the transmission state, the transmission/diffusion switching layer is in the transmission state, and the transmission/reflection switching layer is in the transmission state. Therefore, it is possible for the display element to surely transmit the visible light.

Application Example 10

This application example of the invention is directed to an image display system including a projector adapted to emit visible light forming a picture, and a screen on which the picture is projected, wherein the screen includes a display element to be controlled using the method of controlling a display element according to the above application example of the invention.

According to the image display system using the display element, the screen can be switched between the transmission state and the diffusion state. Therefore, when no picture is projected, the screen can be set to the transmission state. Further, since the sufficient diffusion characteristics can be obtained in the diffusion state of the screen, the picture with preferable quality can be displayed.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1B:
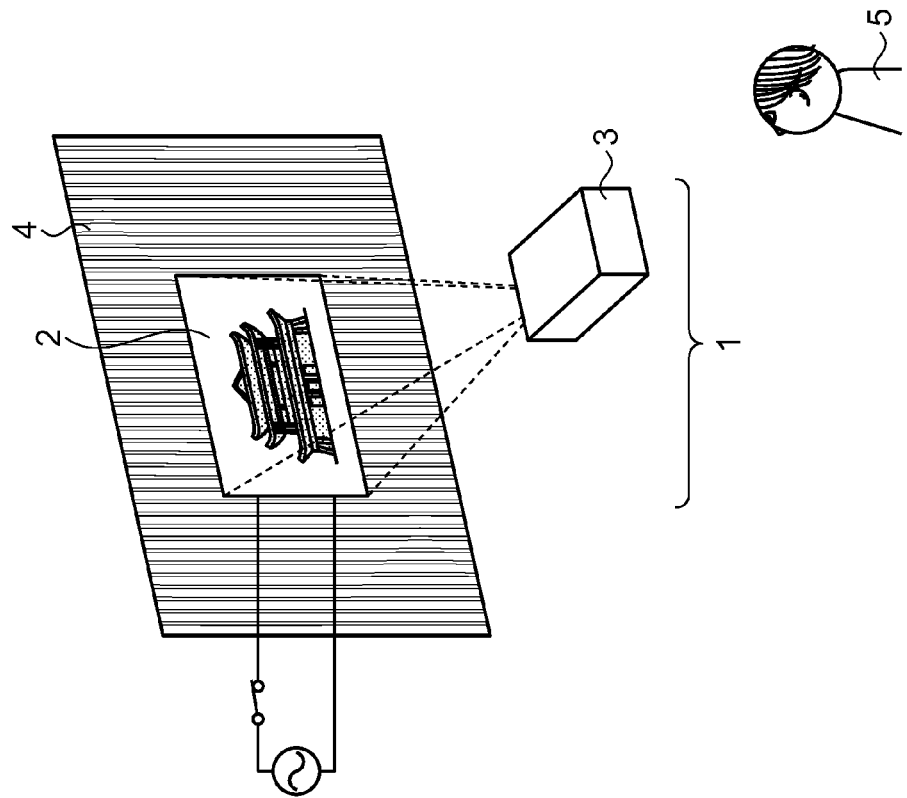
FIGS. 1A and 1B are schematic diagrams showing an overall configuration of a display system according to a first embodiment.

Hereinafter, some embodiments of the invention will be explained with reference to the accompanying drawings. In the drawings used in the explanation, the sizes and the scales of the structures in the drawings might be made different from the actual structures in some cases in order to show characteristic portions in an easy-to-understand manner. Further, the constituents substantially identical to each other in the embodiments are shown with the same reference numerals in the drawings, and the detailed explanation therefor might be omitted in some cases.

First Embodiment

Figure 1A:
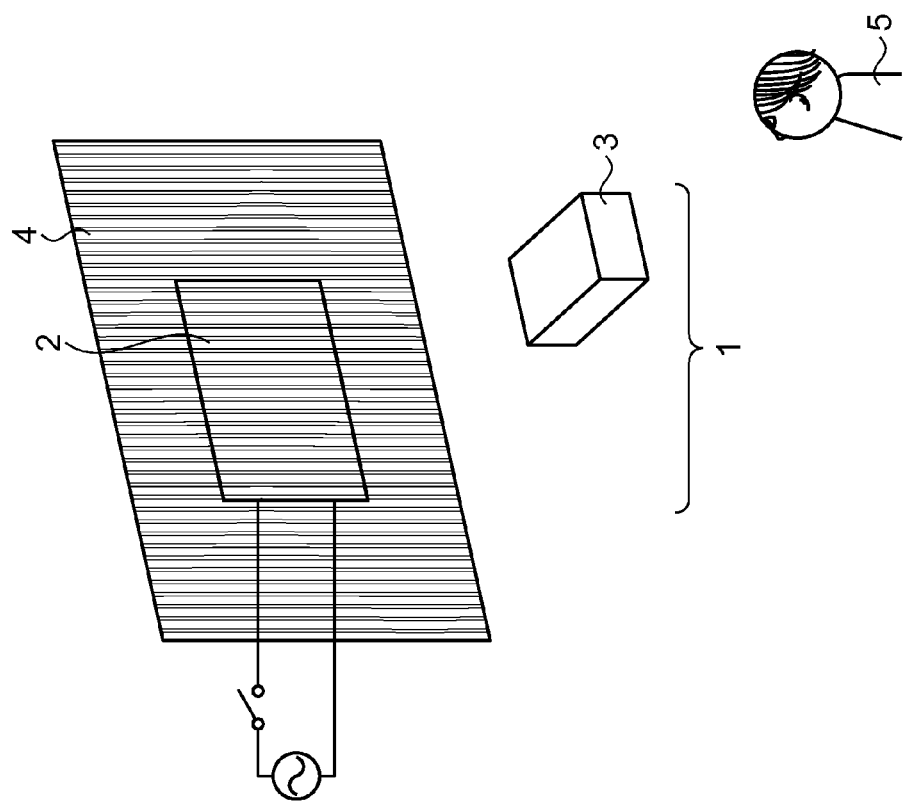

FIGS. 1A and 1B are schematic diagrams showing an overall configuration of a display system according to a first embodiment. FIG. 1A is a diagram showing a nonuse state of the display system 1, and FIG. 1B is a diagram showing a use state of the display system 1. The display system 1 is composed of a projector 3 and a screen 2 as a display element. A background 4 exists independently of the display system 1, and represents, for example, a wood-effect wall surface in the present embodiment.

The display system 1 according to the first embodiment roughly operates as follows.

When the display system 1 is not in use, no voltage is applied to the screen 2 as shown in FIG. 1A. The projector 3 is also powered off, and no picture is output. On this occasion, the screen 2 keeps the transparent state, and the background 4 is visually recognized by the observer 5. Therefore, it results that the scenery as if screen 2 were not present can be provided.

When the display system 1 is in use, a voltage is applied to the screen 2 to thereby provide a backward diffusion state as shown in FIG. 1B. Thus, the projector 3 can project the picture in substantially the same manner as in the case in which a normal screen is present, and it becomes possible for the observer 5 to observe the picture sufficient to be visually recognized.

Figure 2:
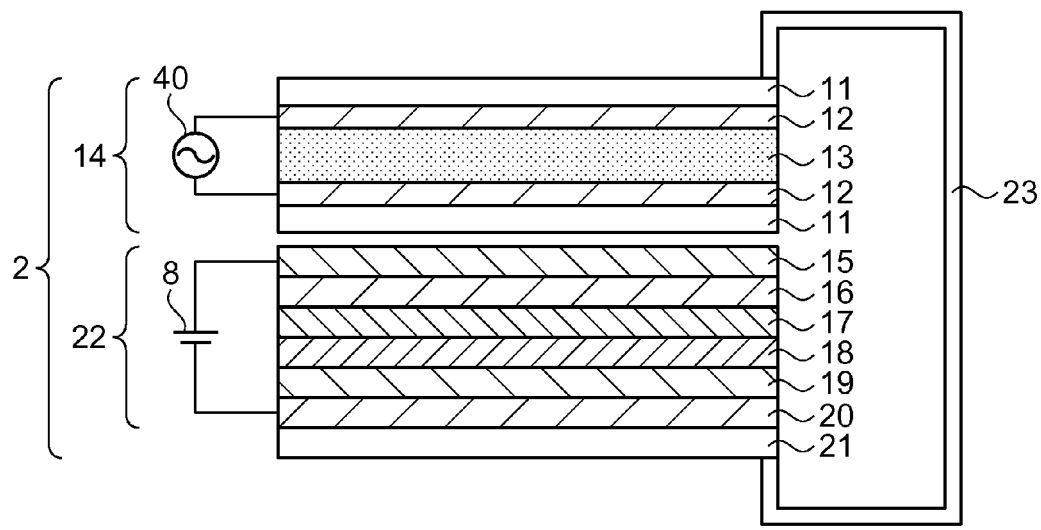
FIG. 2 is a schematic cross-sectional view showing a configuration of a screen.

FIG. 2 is a schematic cross-sectional view showing a configuration of the screen. As shown in FIG. 2, the screen 2 is composed of a transmission/diffusion switching layer 14 and a transmission/reflection switching layer 22 overlapping each other.

The transmission/diffusion switching layer 14 is provided in the form of sandwiching a polymer-dispersed liquid crystal layer 13 with two transparent substrates 11 each provided with a transparent electrode 12 as an electrode formed of a transparent conductive film. The transparent electrode 12 is connected to a liquid crystal driving power supply 40, and by applying an electric field to the polymer-dispersed liquid crystal layer 13, it becomes possible to switch the transmission/diffusion switching layer 14 between transmission and diffusion. Here, as the polymer-dispersed liquid crystal layer 13, there is used one having a so-called reverse mode which is kept in the transparent state when applying no electric field, and becomes in the diffusion state when applying an electric field.

As disclosed in Document 3, the transmission/reflection switching layer 22 is formed by stacking a transparent conductive film 20 as an electrode, an ion storage layer 19, a solid electrolyte layer 18, a buffer layer 17, a catalyst layer 16, and a light control mirror layer 15 on a transparent substrate 21. It is possible to use, for example, indium tin oxide (ITO) as the transparent conductive film 20, $WO_3$ as the ion storage layer 19, $Ta_2O_5$ as the solid electrolyte layer 18, Al as the buffer layer 17, Pd as the catalyst layer 16, and an Mg—Ni alloy, which is an electrochromic material, as the light control mirror layer 15. Document 3 discloses the fact that each of the layers can be deposited at room temperature using a magnetron sputtering system. Further, the light control mirror layer 15 and the transparent conductive film 20 each function as an electrode for supplying the electrical power of a direct-current power supply 8.

The initial state of the transmission/reflection switching layer 22 is the mirror state. When applying a voltage of about 5V, hydrogen ions stored in the ion storage layer 19 migrate to the inside of the light control mirror layer 15 to thereby hydrogenate the Mg—Ni alloy in the metal state. Thus, the Mg—Ni alloy becomes in the non-metal state to thereby change the state of the transmission/reflection switching layer 22 to the transparent state. Further, when reversing the polarity and applying the voltage of about −5V, the hydrogen ions returns to the inside of the ion storage layer 19, and thus the light control mirror layer 15 is restored to the original metal state, and functions as a mirror. These phenomena are also disclosed in Document 3.

Here, by overlapping the transmission/diffusion switching layer 14 and the transmission/reflection switching layer 22, which are formed by the respective processes independent of each other, using mechanical pinch such as a mechanical clip 23, the screen 2 is obtained. Since the transmission/diffusion switching layer 14 and the transmission/reflection switching layer 22 are driven in an electrically independent manner, and function as a screen without problems providing the alignment accuracy therebetween is in the level of not causing substantial displacement in the outer shape, the screen 2 can be formed by overlapping them using a simple and easy process. It should be noted that the overlapping process is not limited to the mechanical pinch, but any process not affecting the functions of the transmission/diffusion switching layer 14 and the transmission/reflection switching layer 22 such as a bonding process can be adopted.

When using the screen 2, the screen 2 is set to the diffusion state. On this occasion, the transmission/diffusion switching layer 14 is controlled to be in the diffusion state, and the transmission/reflection switching layer 22 is controlled to be in the mirror state. When the screen 2 is not used, the screen 2 is set to the transmission state. On this occasion, the transmission/diffusion switching layer 14 is controlled to be in the transmission state, and the transmission/reflection switching layer 22 is controlled to be in the transmission state.

It should be noted that it is also possible to dispose a protective layer, not shown, as an upper layer of the light control mirror layer 15 to thereby prevent the deterioration of the light control mirror layer 15 if necessary. In such a manner as described above, it becomes possible to provide the screen 2 for a front projection type projector, which is able to provide a large backward scattering component when in use, is transparent when not in use, and prevents the surrounding scenery from being damaged.

As described above, according to the present embodiment, there are obtained the following advantages.

1. According to the present embodiment, the screen 2 has the transmission/diffusion switching layer 14 and the transmission/reflection switching layer 22 overlapped each other each of which can be switched in the state by electrical switching. When it is required to diffuse the light, the transmission/diffusion switching layer 14 is set to the diffusion state, and the transmission/reflection switching layer 22 is set to the reflection (mirror) state. Thus, the visible light entering the screen 2 is diffused in the transmission/diffusion switching layer 14. Further, the visible light transmitted through the transmission/diffusion switching layer 14 is reflected by the transmission/reflection switching layer 22, and is then diffused in the transmission/diffusion switching layer 14. Therefore, the visible light can surely be diffused.

When it is required to transmit the visible light, the transmission/diffusion switching layer 14 is set to the transmission state, and the transmission/reflection switching layer 22 is set to the transmission state. Thus, the visible light entering the display element is transmitted through the transmission/diffusion switching layer 14 and the transmission/reflection switching layer 22. Therefore, it is possible for the screen 2 to surely transmit the visible light. Therefore, the screen 2 is capable of switching between the transmission state and the diffusion state by electrical switching with preferable quality.

2. According to the present embodiment, the polymer-dispersed liquid crystal layer 13 is of the "reverse mode" in which the transparent state is set when no voltage is applied thereto. The transmission/reflection switching layer 22 is bistable, and when setting the screen 2 to the transmission state, the transmission/reflection switching layer 22 is set to the transparent state in advance. The polymer-dispersed liquid crystal layer 13 is kept in the transparent state in the state in which no voltage is applied thereto. Thus, in the case of setting the screen 2 to the transmission state, the transparent state can be maintained in the state in which the power consumption is reduced. As a result, a resource-saving display element can be obtained.

3. According to the present embodiment, the screen 2 can be switched between the transmission state and the diffusion state. Therefore, when no picture is projected, the screen can be set to the transmission state. Further, since the sufficient diffusion characteristics can be obtained in the diffusion state of the screen, the picture with preferable quality can be displayed.

Second Embodiment

Figure 3:
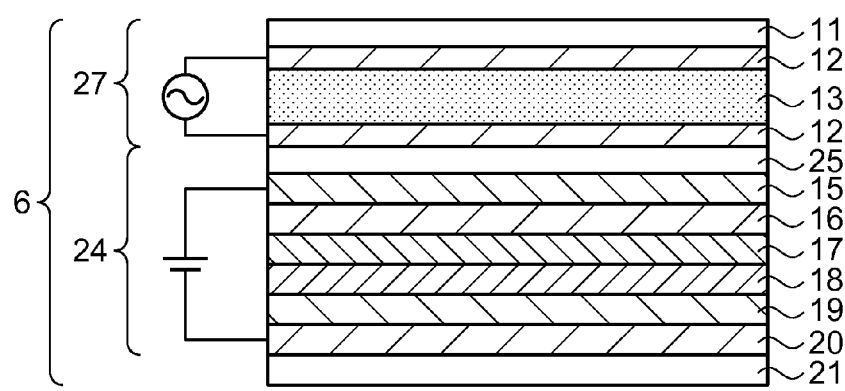
FIG. 3 is a schematic cross-sectional view showing a configuration of a screen according to a second embodiment.

Then, a screen according to another embodiment of the invention will be explained using a schematic cross-sectional diagram of FIG. 3 showing a configuration of the screen. The present embodiment is different from the first embodiment in the point that the transmission/diffusion switching layer and the transmission/reflection switching layer are stacked directly without intervention of the substrate. It should be noted that the explanation on the point the same as in the first embodiment will be omitted.

As shown in FIG. 3, in the screen 6, a transmission/reflection switching layer 24 and a transmission/diffusion switching layer 27 are disposed so as to overlap each other. Since the transmission/reflection switching layer 24 has substantially the same structure as that of the transmission/reflection switching layer 22 according to the first embodiment, and the manufacturing process thereof is substantially the same, the explanation of the part common to the both layers will be omitted. The point in which the present embodiment is different from the first embodiment is that the transparent substrate 11 located on the transmission/reflection switching layer 22 side in the transmission/diffusion switching layer 14 is replaced with a protective layer 25. In the manufacturing procedure, the protective layer 25 is stacked after depositing the light control mirror layer 15. After forming the transmission/reflection switching layer 24 stacked with the protective layer 25, the manufacturing process of the transmission/diffusion switching layer 27 is performed. The protective layer 25 can be formed by stacking a low-permeability material such as $SiO_2$ as thick as 5 µm.

The transparent electrode 12 is deposited on the transmission/reflection switching layer 24, which forms a lower support medium for the transmission/diffusion switching layer 27. Further, the transparent electrode 12 is also deposited on the transparent substrate 11, which forms an upper support substrate for the transmission/diffusion switching layer 27. Subsequently, the liquid crystal is made to fall in drops on the transmission/reflection switching layer 24, on which the transparent electrode 12 has already been deposited, using a liquid crystal falling-drop method, then the transparent substrate 11 attached with the transparent electrode 12 is bonded thereto, and then the seal curing is performed to thereby complete the screen 6. It should be noted that although in the present embodiment the liquid crystal falling-drop method is shown as the liquid crystal encapsulation method, it is also possible to use a liquid crystal injection method.

Further, the transmission/reflection switching layer 24 and the transmission/diffusion switching layer 27 are electrically independent of each other, and the transmission/diffusion state of the transmission/diffusion switching layer 27 and the transmission/mirror state of the transmission/reflection switching layer 24 can be controlled independently of each other.

By adopting such a configuration, it becomes possible to reduce the distance between the place where the light is diffused by the transmission/diffusion switching layer 27 and the place where the light is reflected by the transmission/reflection switching layer 24. The light having entered the screen 6 is forward scattered by the polymer-dispersed liquid crystal layer 13 prior to reaching the light control mirror layer 15, then reflected by the light control mirror layer 15, and then enters again the polymer-dispersed liquid crystal layer 13 to thereby be forward scattered. Thus, it results that the light having entered the screen 6 is backward scattered by the screen 6 as a whole, and is then visually recognized by the observer.

Figure 4A:
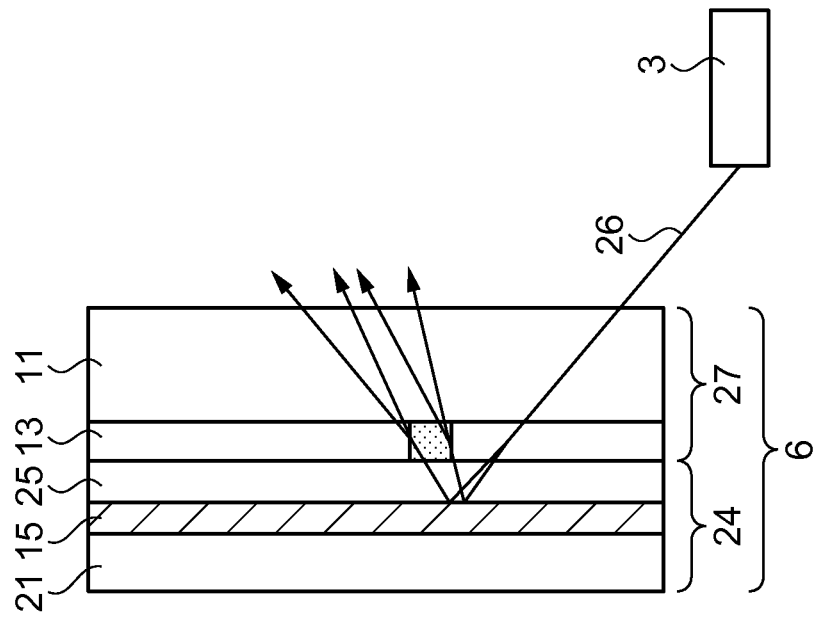
FIGS. 4A and 4B are schematic diagrams for explaining a behavior of the light in the screen.
Figure 4B:
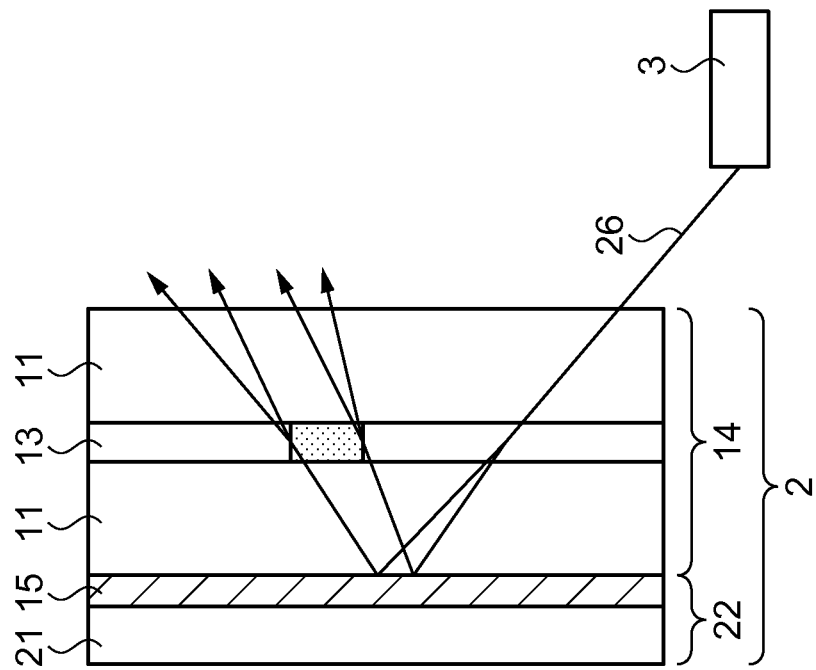

FIGS. 4A and 4B are schematic diagrams for explaining a behavior of the light in the screen. In the case of the structure described in the first embodiment, the light control mirror layer 15 of the transmission/reflection switching layer is located distant from the polymer-dispersed liquid crystal layer 13 as much as the thickness of the transparent substrate 11 for supporting the transmission/diffusion switching layer 14 as shown in FIG. 4A. Therefore, since the scattered component of the light first entering the polymer-dispersed liquid crystal layer 13 is reflected by the light control mirror layer 15 after spreading widely, and is then scattered again by the polymer-dispersed liquid crystal layer 13, the pixels are visually recognized in a significantly indistinct state. In contrast, in the case of the structure described in the second embodiment, since the scattered component of the light first entering the polymer-dispersed liquid crystal layer 13 is reflected by the light control mirror layer 15 before spreading widely, and is then scattered again by the polymer-dispersed liquid crystal layer 13 as shown in FIG. 4B, it becomes possible to reduce blur of the pixels. Thus, it becomes possible to provide the observer with a clear and high-resolution picture.

As described above, according to the present embodiment, there are obtained the following advantages.

1. According to the present embodiment, the light control mirror layer 15 and the polymer-dispersed liquid crystal layer 13 are stacked one another via the protective layer 25. Therefore, it is possible to decrease the distance between the light control mirror layer 15 and the polymer-dispersed liquid crystal layer 13 compared to the case in which the light control mirror layer 15 and the polymer-dispersed liquid crystal layer 13 are stacked one another via the transparent substrate 11. Therefore, when setting the screen 6 to the diffusion state, it becomes possible to reduce the picture blur due to crossing between the light entering the screen 6 and then forward scattered by the polymer-dispersed liquid crystal layer 13 prior to reaching the place where the light is reflected by the light control mirror layer 15, and the light forward scattered by the polymer-dispersed liquid crystal layer 13 after reflected by the light control mirror layer 15.

Third Embodiment

Figure 5:
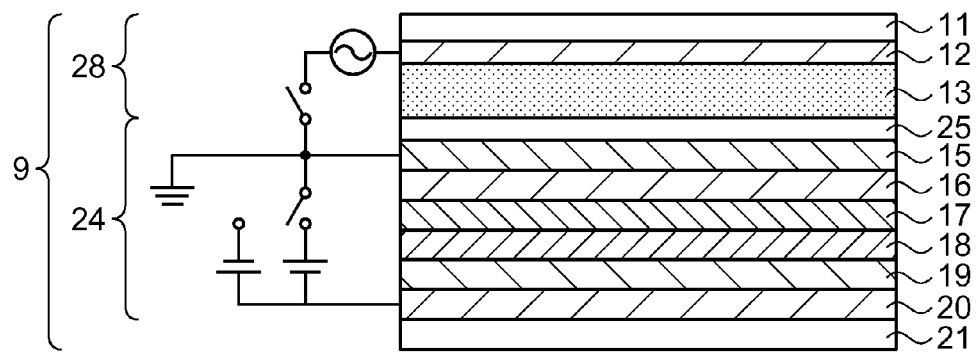
FIG. 5 is a schematic cross-sectional view showing a configuration of a screen according to a third embodiment.

Then, a screen according to still another embodiment of the invention will be explained using a schematic cross-sectional diagram of FIG. 5 showing a configuration of the screen. The present embodiment is different from the second embodiment in the point that the light control mirror layer 15 functions as both of the electrode of the polymer-dispersed liquid crystal layer 13 and the electrode of the transmission/reflection switching layer 24. It should be noted that the explanation on the point the same as in the second embodiment will be omitted.

As shown in FIG. 5, the screen 9 is provided with the transmission/reflection switching layer 24 and a transmission/diffusion switching layer 28. Since the transmission/reflection switching layer 24 has substantially the same structure as that in the second embodiment, and the manufacturing process thereof is substantially the same, the explanation thereof will be omitted. After forming the protective layer 25, the manufacturing process of the transmission/diffusion switching layer 28 is performed.

The transparent substrate 11 forming the upper support substrate is provided with the transparent electrode 12. Subsequently, the liquid crystal is made to fall in drops on a substrate having been provided with the transmission/reflection switching layer 24 using a liquid crystal falling-drop method, then the transparent substrate 11 attached with the transparent electrode 12 is bonded thereto, and then the seal curing is performed to thereby complete the screen 9. It should be noted that although in the present embodiment the liquid crystal falling-drop method is shown as the liquid crystal encapsulation method, it is also possible to use a liquid crystal injection method.

In the third embodiment, the light control mirror layer 15 functions as the upper electrode for the transmission/reflection switching layer 24, and at the same time functions as the lower electrode of the transmission/diffusion switching layer 28. Therefore, the transmission/reflection switching layer 24 and the transmission/diffusion switching layer 28 can be driven independently of each other by, for example, grounding the light control mirror layer 15, and connecting the transmission/reflection switching layer 24 and the transmission/diffusion switching layer 28 to respective power supplies independent of each other via respective switches.

When projecting a picture on the screen 9, since it is required to reflect the light projected on the screen 9, the transmission/reflection switching layer 24 functions as a mirror. Therefore, a negative bias voltage with respect to the light control mirror layer 15 is applied to the transparent conductive film 20 to thereby obtain the mirror state. Subsequently, by setting the switch in the light control mirror area to the open state and setting the switch of the transmission/diffusion switching layer 28 to the closed state to thereby apply a bipolar alternating-current bias to the transparent electrode 12, the transmission/diffusion switching layer 28 is set to the diffusion state. Thus, the transmission/reflection switching layer 24 can be set to the mirror state. On this occasion, since the light control mirror layer 15 is grounded, the hydrogen ions in the transmission/reflection switching layer 24 do not migrate regardless of whether or not the alternating-current bias is applied to the transparent electrode 12.

When the screen 9 is not in use, the screen 9 is kept in the transparent state. Therefore, a positive bias voltage with respect to the light control mirror layer 15 is applied to the transparent conductive film 20 to thereby obtain the transparent state. Subsequently, the switch of the light control mirror area is set to the open state to thereby keep the state. The transmission/diffusion switching layer 28 adopts the reverse mode, and is therefore kept transparent in the state in which no electric field is applied. Thus, the screen in the transparent state can be obtained.

As described above, according to the present embodiment, there is obtained the following advantage.

1. According to the present embodiment, the light control mirror layer 15 is located between the polymer-dispersed liquid crystal layer 13 and the transmission/reflection switching layer 24. Further, the light control mirror layer 15 functions as both of the electrode for applying a voltage to the polymer-dispersed liquid crystal layer 13 and the electrode for applying a voltage to the transmission/reflection switching layer 24. Therefore, the distance between the polymer-dispersed liquid crystal layer 13 and the transmission/reflection switching layer 24 can further be shortened compared to the case of disposing the electrodes corresponding to the respective layers between the polymer-dispersed liquid crystal layer 13 and the transmission/reflection switching layer 24. In addition thereto, it is possible to reduce the number of interfacial surfaces between the place where the light is diffused by the transmission/diffusion switching layer 28 and the place where the light is reflected by the transmission/reflection switching layer 24. Therefore, the Fresnel reflection can be reduced, and it becomes possible for the observer to visually recognize the picture with more sharply-defined resolution. Further, since the transparent electrode including rare metals can further be omitted, measures against the resource depletion can be provided, and at the same time, it becomes possible to produce the screen 9 with good productivity.

Fourth Embodiment

Then, a screen according to still another embodiment of the invention will be explained with reference to FIGS. 6 through 10. The present embodiment is different from the first embodiment in the point that the polymer-dispersed liquid crystal layer 13 in the transmission/diffusion switching layer 14 is made of a polymer-dispersed hologram liquid crystal. It should be noted that the explanation on the point the same as in the first embodiment will be omitted.

Figure 6:
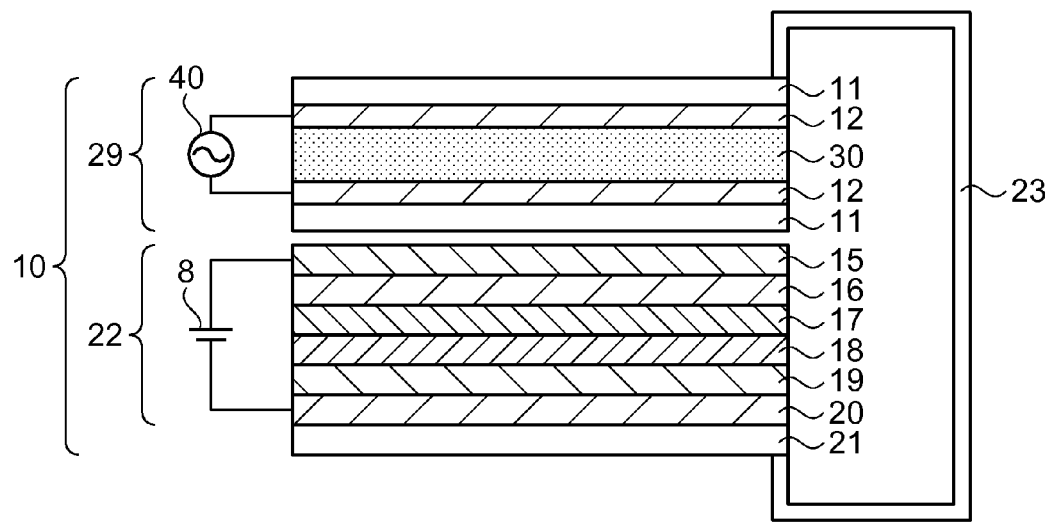
FIG. 6 is a schematic cross-sectional view showing a configuration of a screen according to a fourth embodiment.

FIG. 6 is a schematic cross-sectional view showing a configuration of the screen. As shown in FIG. 6, the screen 10 is provided with the transmission/reflection switching layer 22 and a transmission/diffusion switching layer 29. Further, the transmission/diffusion switching layer 29 is provided with the polymer-dispersed hologram liquid crystal 30.

Figure 7B:
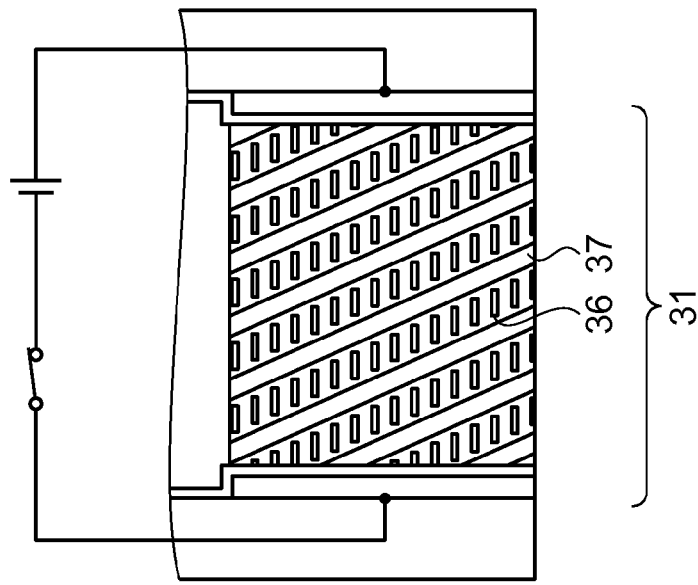
FIGS. 7A and 7B are side cross-sectional views of a polymer-dispersed hologram liquid crystal.
Figure 7A:
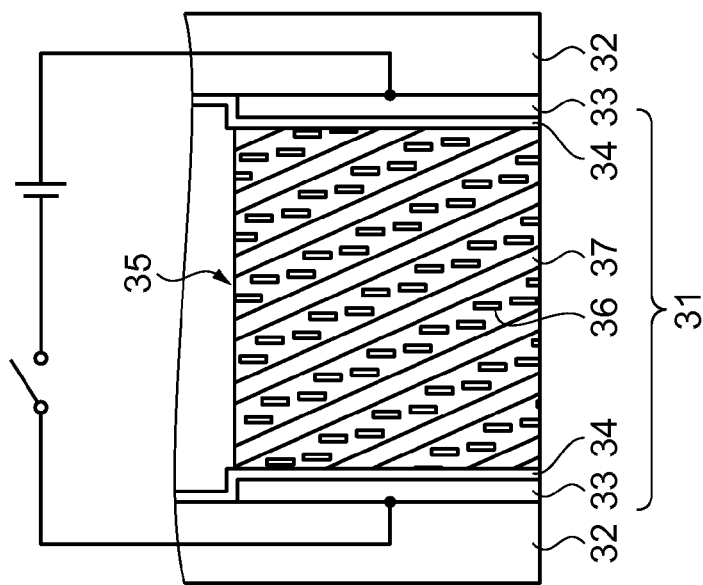

Then, the polymer-dispersed hologram liquid crystal 30 will be explained. FIGS. 7A and 7B are side cross-sectional views of the polymer-dispersed hologram liquid crystal. FIG. 7A shows the state when no electric field is applied, and FIG. 7B shows the state when an electric field is applied. As shown in FIG. 7A, the hologram structure 31 is provided with a pair of substrates 32 each made of a transparent material such as glass disposed so as to be opposed to each other. On the inner surface of each of the substrates 32, there are sequentially stacked an electrode 33 made of a transparent conductive material such as indium tin oxide (ITO), and an oriented film 34 made of polyimide or the like. On the surface of the oriented film 34, there is performed a rubbing process in a certain direction.

Between the pair of substrates 32, there is sandwiched an optical functional layer 35. The optical functional layer 35 has an interference-fringe structure having a number of polymer sections 37 each having a birefringent property and liquid crystal sections 36 disposed alternately in a stacked manner. Further, due to the action of the oriented film 34, the polymer precursor constituting each of the polymer sections 37 and the liquid crystal molecules constituting each of the liquid crystal sections 36 are oriented in the same direction. There can be cited a nematic liquid crystal TL-202, E8 (product of Merk Ltd.) and so on as the liquid crystal used here, and there can be cited biphenyl methacrylate and so on as the polymer precursor. It should be noted that it is desirable to set the mixture fraction of the polymer precursor to 5 through 30 wt %.

Figure 8:
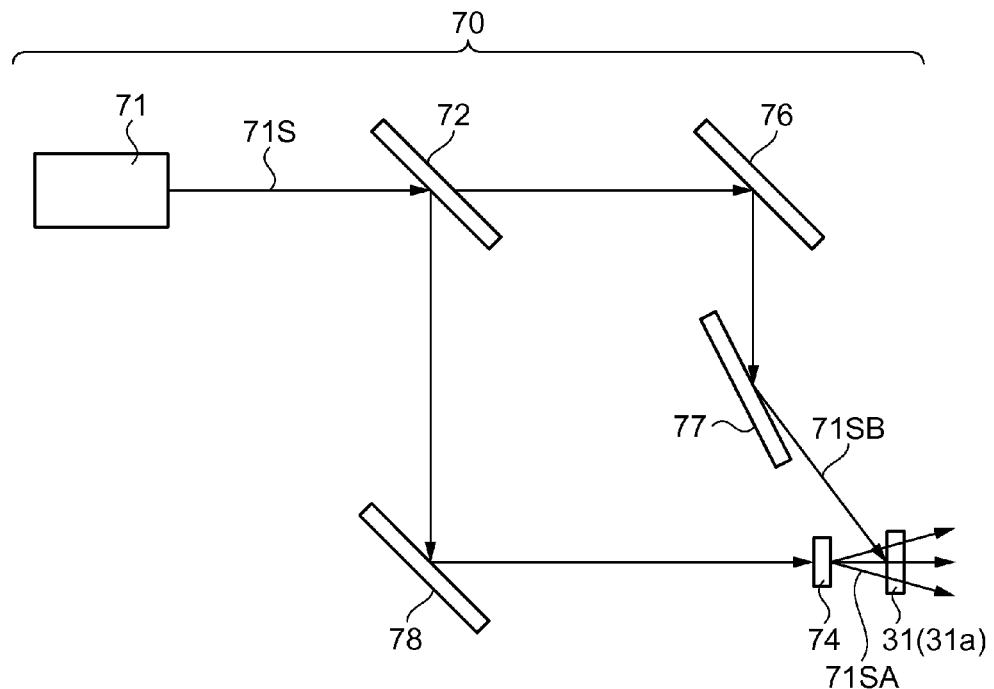
FIG. 8 is an explanatory diagram of a method of manufacturing a hologram structure.

FIG. 8 is an explanatory diagram of a method of manufacturing a hologram structure. The hologram structure described above is manufactured using a two-beam interference exposure device 70. The two-beam interference exposure device 70 is mainly composed of a laser source 71, a beam splitter 72 for branching the laser beam 71S into tow beams, a mirror 78 for guiding one of the laser beams thus branched to a structure 31a as an object wave 71SA, an object 74 to be recorded, mirrors 76, 77 for guiding the other of the laser beams to the structure 31a as a reference wave 71SB. Here, a scattering object is used as the object 74.

The structure 31a in the condition in which the polymer precursor is oriented together with the liquid crystal is irradiated with light from two directions at predetermined angles using the two-beam interference exposure device 70 described above. Then, the polymer precursor is polymerized at places where the light intensity (amplitude) is enhanced due to the interference of the light in the two directions to thereby form the polymer sections 37 shown in FIGS. 7A and 7B, and at the same time, the plurality of polymer sections 37 becomes to express the interference-fringe structure. Thus, the hologram structure 31 is formed. It should be noted that although a single laser source alone is described in FIG. 8, it is possible to form a hologram corresponding to a white reference light by performing the exposure on the hologram recording material using laser sources corresponding respectively to three colors of R, G, and B simultaneously.

Figure 9A:
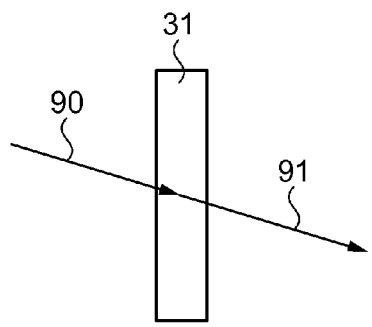
FIGS. 9A and 9B are schematic diagrams for explaining the function of the hologram structure.
Figure 9B:
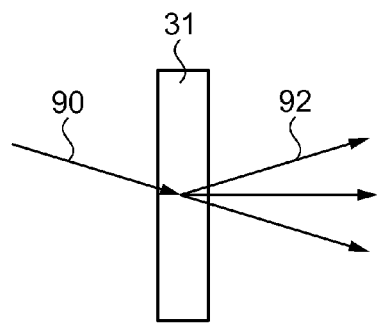

Returning to FIG. 7A, in the hologram structure 31 in the condition with no electric field applied, the polymer precursor constituting the polymer sections 37 and the liquid crystal molecules constituting the liquid crystal sections 36 are oriented in the same direction. Therefore, the refractive index of the liquid crystal sections 36 and the refractive index of the polymer sections 37 are roughly equal to each other. Therefore, the incident light from one of the substrates is transmitted through the optical functional layer 35, and is then emitted from the other of the substrates. FIGS. 9A and 9B are schematic diagrams for explaining the function of the hologram structure. In other words, as shown in FIG. 9A, it results that the incident light 90 to the hologram structure 31 is emitted along an exit light path 91 collinear with the incident light path.

In contrast, in the hologram structure 31 in the condition with an electric field applied, the liquid crystal molecules of the liquid crystal sections 36 alone are aligned along the electric field direction, and the interference-fringe structure by the polymer sections 36 appears as shown in FIG. 7B. Thus, there occurs the condition in which the refractive index of the liquid crystal sections 36 and the refractive index of the polymer sections 37 are different from each other. Therefore, if the light having a wavelength corresponding to the pitch of the interference-fringe structure of the polymer sections 37 enters one of the substrates from a predetermined direction, a hologram pattern in a predetermined direction is emitted. Specifically, if the light enters the hologram structure 31 from the same direction as the reference wave 71SB shown in FIG. 8, substantially the same scatter pattern as in the case of projecting the object wave 71SA is emitted. In other words, as shown in FIG. 9B, it results that the incident light 90 to the hologram structure 31 is emitted as a scattered light 92. Further, the hologram pattern does not appear with respect to the light entering at an angle different from the incident angle of the reference wave 71SB shown in FIG. 8, and the light is emitted along the light path collinear with the incident light path similar to the case of the condition with no electric field applied.

Figure 10:
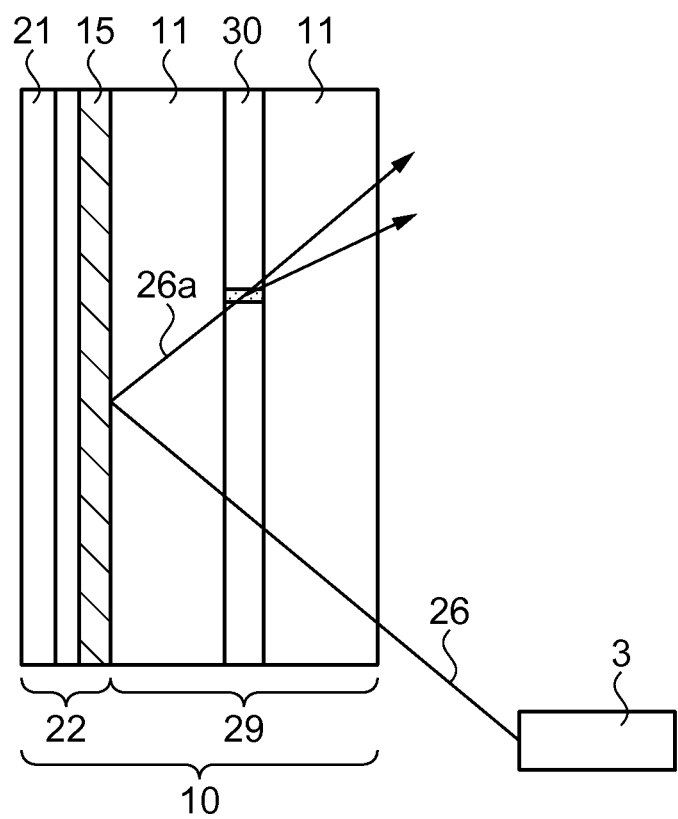
FIG. 10 is a schematic diagram for explaining the operation of a screen having the hologram structure.

FIG. 10 is a schematic diagram for explaining the operation of the screen having the hologram structure. In the incident light beam 26 input from the projector 3 shown in FIG. 10, the positional relationship between the light beam 26a reflected by the light control mirror layer 15 and entering the polymer-dispersed hologram liquid crystal 30 and the polymer-dispersed hologram liquid crystal 30 is the same as the positional relationship between the reference wave 71SB and the hologram structure 31 shown in FIG. 8. Therefore, the polymer-dispersed hologram liquid crystal 30 shown in FIG. 10 functions as a scattering medium with a voltage applied, or a transparent medium with no voltage applied, and can be made to function as a transparent medium with respect to the light beam 26 not yet reflected by the light control mirror layer 15, or a scattering medium with respect to the light beam 26a after reflected by the light control mirror layer 15 even when applying a voltage.

Thus, the incident light is prevented from being scattered prior to reaching the mirror section in the light control area, and it becomes possible for the observer to visually recognize only the light forward scattered by the liquid crystal scattering section after reflected by the mirror section in the light control area. Therefore, it becomes possible to further reduce the picture blur, and thus, it becomes possible to visually recognize the picture with extremely clear resolution.

It should be noted that although in the present embodiment there is adopted the configuration of orienting the polymer precursor constituting the polymer sections 37 and the liquid crystal molecules constituting the liquid crystal sections 36 in a certain direction as shown in FIGS. 7A and 7B, it is also possible to adopt a configuration of forming twisted orientation between the pair of substrates 32. Specifically, the twisted orientation can be realized by adding a small amount of material having a chiral dopant to the optical functional layer 35. The polarization dependency of the interferential effect and the scattering effect can be reduced by adopting the twisted orientation.

It should be noted that the scope of the invention is not limited to the embodiments described above. A variety of modifications are possible within the scope or the spirit of the invention. For example, it is also possible to adopt a screen using a liquid crystal layer driven in a dynamic scattering mode instead of the polymer-dispersed liquid crystal layer. The liquid crystal layer has, for example, homeotropic alignment (perpendicular orientation). When applying a voltage higher than a threshold to the liquid crystal layer, the orientational effect on the liquid crystal molecules due to the current becomes stronger than that due to the electric field, and thus a hydrodynamic instability phenomenon occurs. This instability phenomenon is called Carr-Helfrich effect. Due to this effect, turbulent flow is caused in the liquid crystal layer, and the liquid crystal layer becomes in a dynamic scattering state.

The entire disclosure of Japanese Patent Application No. 2011-034284, filed Feb. 21, 2011 is expressly incorporated by reference herein.

What is claimed is:

1. An image display device comprising:
 a projector adapted to emit visible light forming a picture; and
 a screen on which the picture is projected, the screen having a display element, wherein
 the projector is spaced apart from the screen,
 the display element includes:
  a transmission/diffusion switching layer switched between a diffusion state of diffusing the visible light and a transmission state of transmitting the visible light by electrical switching, the transmission/diffusion switching layer including a first electrode and a second electrode; and
  a transmission/reflection switching layer switched between a reflection state of reflecting the visible light and a transmission state of transmitting the visible light by electrical switching, the transmission/reflection switching layer including the second electrode and a third electrode, wherein
 the transmission/diffusion switching layer and the transmission/reflection switching layer overlap each other, and
 the second electrode is a single common electrode of the transmission/diffusion switching layer and the transmission/reflection switching layer.

2. The image display device according to claim 1, wherein the transmission/diffusion switching layer includes
 a polymer-dispersed liquid crystal layer disposed between the pair of first and second electrodes, and the transmission/reflection switching layer includes a light control mirror layer having an electrochromic material.

3. The image display device according to claim 2, wherein the light control mirror layer and the polymer-dispersed liquid crystal layer are stacked via a protective layer.

4. The image display device according to claim 3, wherein the second electrode is the light control mirror layer.

5. The image display device according to claim 4, wherein the light control mirror layer is grounded.

6. The image display device according to claim 2, wherein the polymer-dispersed liquid crystal layer is in a reverse mode in which the transmission state can be obtained with no voltage applied.

7. The image display device according to claim 2, wherein the polymer-dispersed liquid crystal layer is a hologram structure including polymer sections having a birefringent property and liquid crystal sections disposed alternately in a stacked manner, and is capable of electrically switching between transmission and diffusion of visible light passing through the hologram structure.

8. A method of controlling the image display device according to claim 1, the method comprising:
controlling the display element such that, when the display element is set to the diffusion state,
the transmission/diffusion switching layer is set to the diffusion state; and
the transmission/reflection switching layer is set to the reflection state.

9. A method of controlling the image display device according to claim 1, the method comprising:
controlling the display element such that, when the display element is set to the transmission state,
the transmission/diffusion switching layer is set to the transmission state; and
the transmission/reflection switching layer is set to the transmission state.

* * * * *